(12) United States Patent
Soriano Fosas et al.

(10) Patent No.: US 11,358,339 B2
(45) Date of Patent: Jun. 14, 2022

(54) 3D PRINTING APPARATUS AND METHODS OF OPERATING A 3D PRINTING APPARATUS

(71) Applicant: HEWLETT-PACKARD DEVELOPMENT COMPANY, L.P., Spring, TX (US)

(72) Inventors: David Soriano Fosas, Vancouver, WA (US); Juan Manuel Zamorano, Sant Cugat del Valles (ES); Vicente Granados Asensio, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 275 days.

(21) Appl. No.: 16/343,850

(22) PCT Filed: Jan. 31, 2017

(86) PCT No.: PCT/US2017/015898
§ 371 (c)(1),
(2) Date: Apr. 22, 2019

(87) PCT Pub. No.: WO2018/143956
PCT Pub. Date: Aug. 9, 2018

(65) Prior Publication Data
US 2019/0240915 A1  Aug. 8, 2019

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/153* (2017.08); *B29C 64/307* (2017.08);
(Continued)

(58) Field of Classification Search
CPC ..... B29C 64/307; B29C 64/153; B33Y 10/00; B33Y 30/00; B33Y 50/02
(Continued)

(56) References Cited

U.S. PATENT DOCUMENTS

| 6,022,207 A | 2/2000 | Dahlin et al. |
| 2003/0133822 A1 | 7/2003 | Harryson |

(Continued)

FOREIGN PATENT DOCUMENTS

| CN | 204749297 | 11/2015 |
| CN | 105499569 | 4/2016 |

(Continued)

OTHER PUBLICATIONS

"Smoke Signal—New Device to Help Prevent 3D Printer Fires Launches on Kickstarter"; Oct. 7, 2014; https://3dprint.com/18064/smoke-signal-3d-print-fire/.
(Continued)

*Primary Examiner* — Joseph S Del Sole
*Assistant Examiner* — Lawrence D. Hohenbrink, Jr.
(74) *Attorney, Agent, or Firm* — HP Inc. Patent Department

(57) ABSTRACT

Examples of a 3D printing apparatus arranged to perform a print operation using build material, and methods of operating such a 3D printing apparatus, are described. In one case, a 3D printer is arranged to perform a print operation using build material whilst a build material temperature sensed by the printer is below a threshold temperature of the build material. The printer is arranged to obtain a threshold temperature indicator in advance of a respective print operation.

18 Claims, 5 Drawing Sheets

(51) Int. Cl.
*B29C 64/153* (2017.01)
*B29C 64/307* (2017.01)
*B33Y 10/00* (2015.01)
*B33Y 30/00* (2015.01)

(52) U.S. Cl.
CPC .............. *B33Y 10/00* (2014.12); *B33Y 30/00* (2014.12); *B33Y 50/02* (2014.12)

(58) Field of Classification Search
USPC .......................................... 264/40.1; 425/375
See application file for complete search history.

(56) References Cited

U.S. PATENT DOCUMENTS

| | | |
|---|---|---|
| 2008/0230414 A1 | 9/2008 | Perret et al. |
| 2011/0223349 A1* | 9/2011 | Scott ................ B29C 31/066 |
| | | 427/532 |
| 2013/0224423 A1 | 8/2013 | Mikulak et al. |
| 2014/0265049 A1* | 9/2014 | Burris ................ B29C 64/277 |
| | | 264/497 |
| 2015/0110910 A1 | 4/2015 | Hartmann |
| 2015/0190966 A1 | 7/2015 | Griszbacher et al. |
| 2016/0193785 A1 | 7/2016 | Bell et al. |
| 2017/0239719 A1* | 8/2017 | Buller ................ B33Y 30/00 |

FOREIGN PATENT DOCUMENTS

| | | |
|---|---|---|
| EP | 1375115 | 1/2004 |
| WO | WO-2014144255 A2 | 9/2014 |
| WO | WO-2016050319 A1 | 4/2016 |
| WO | WO-2016097911 | 6/2016 |

OTHER PUBLICATIONS

Zalosh, R.; "3D Printer Fire and Explosion Protection Challenges"; Jan. 29, 2016; http://www.sfpe-rockymountain.org/resources/Documents/Symposium/2016%20Symposium%20Detail.

* cited by examiner

3D PRINTING APPARATUS AND METHODS OF OPERATING A 3D PRINTING APPARATUS

BACKGROUND

Additive manufacturing systems, including those commonly referred to as "3D printers", build three-dimensional (3D) objects from selective addition of build material. The build material from which an object is manufactured may vary depending on the application of the object. Different build materials may have different characteristics. In cases in which 3D printers use heat to fuse the build material, different build materials may have different fusing temperatures and may be associated with different respective heating parameters. For instance, such parameters may include heating temperature and/or heating time.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Figure 1:
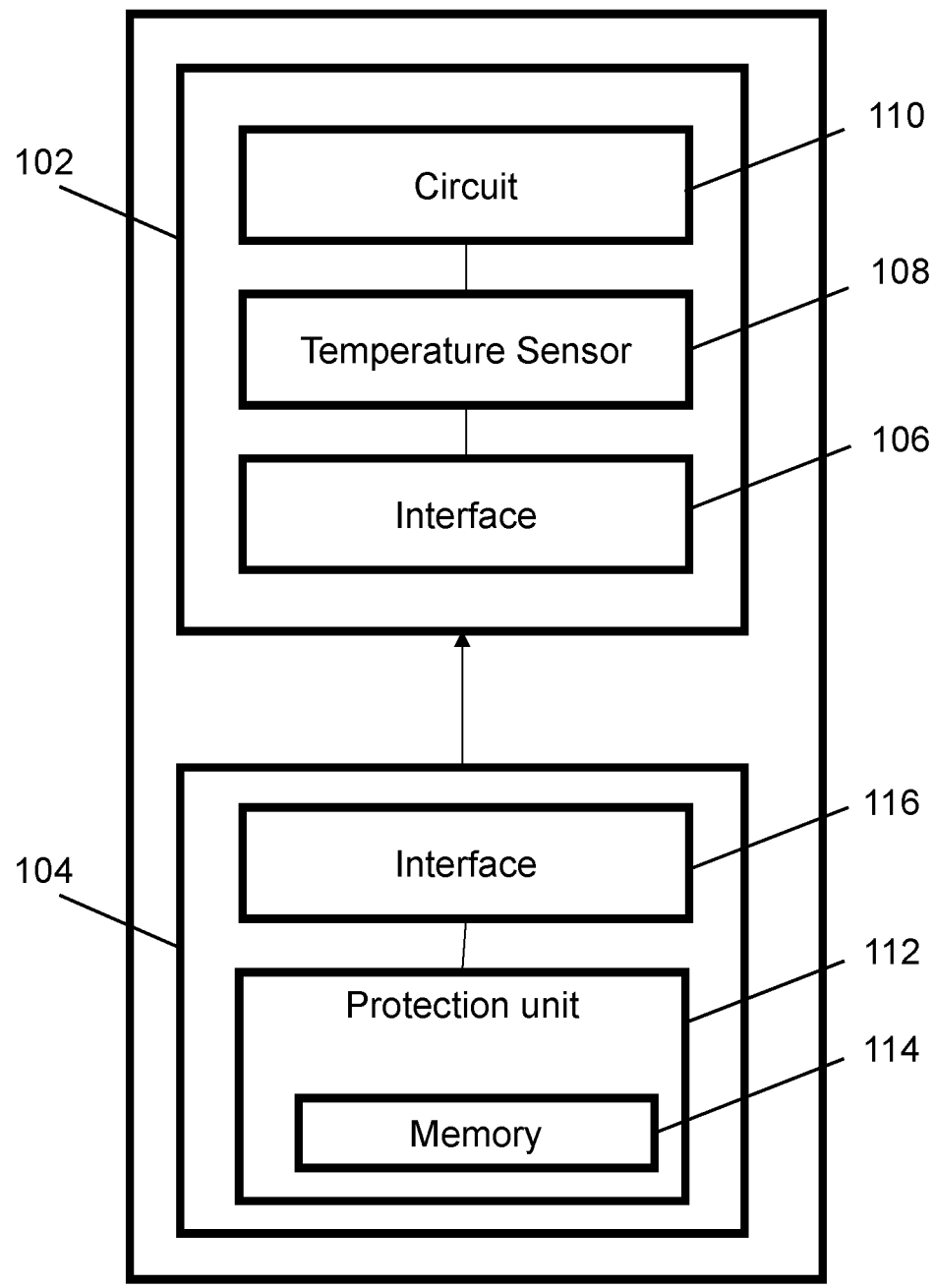
FIG. 1 is a schematic diagram of a 3D printing apparatus according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In an example 3D printer system, build material is deposited in layers in a working area. Chemical agents, referred to herein as "printing agents", are selectively deposited onto each layer within the working area. In one case, the printing agents may comprise a fusing agent and a detailing agent. In this case, the fusing agent is selectively applied to a layer in areas where particles of the build material are to be fused together by subsequent application of energy, and the detailing agent is selectively applied where the fusing action is to be reduced. For example, a detailing agent may be applied to reduce fusing at an object boundary to produce a part with sharp and smooth edges. Following the application of printing agents, energy is applied to the layer. This fuses particles of build material according to the agents that have been applied. The process is then repeated for another layer, such that objects are built from a series of cross-sections. In other cases, one or other of the fusing agent and the detailing agent may be applied. For example, in some cases, a fusing agent may be selectively applied to regions of a layer of build material which are to be fused. In another example, a detailing agent may be selectively applied to regions of a layer of build material that are not to be fused.

3D printer systems may comprise different units. An example of a 3D printer system comprises a 3D printer and a build unit. The build unit may comprise a build platform, on which a 3D object may be built, and a build material store. The build material store may contain build material from which the 3D object is built. The build material may be, for example, a build powder or a so-called "short fiber" build material. The build unit may have to be filled or refilled with build powder as the build powder is depleted. For example, the build unit may have to be refilled when it is empty of build powder. According to an example, the build unit may be filled at a build powder management station, which is separate from the 3D printer and part of the 3D printer system. The build powder management station may contain build powder or draw build powder from one or more build powder containers, which store individual build powders. The build unit may be removably installable in the 3D printer so that it can be decoupled and moved to the build powder management station to carry out a build powder fill or refill operation before being returned to the 3D printer.

In other examples of 3D printer systems, the build unit 104 may be integral with the 3D printer 102.

There are various different kinds of build materials from which a particular part may be built. The choice of build material may be made based on the desired properties of the part. In certain additive manufacturing systems, the build material may be changed between builds accordingly. For example, various plastic powder types can be used as the raw build material; for example, thermoplastics, such as polyamide (PA) 11, PA12, and thermoplastic polyurethane (TPU), etc. In other examples, metal powders may be used.

Different build materials may have different thermal properties that effect the operating parameters used during a build. For example, different preheat temperatures may be used for different types of powder. In other examples, different fuse temperatures may be used for different types of powder.

The aforementioned build materials may solidify under a wide range of different conditions and respective different 3D printer operating parameters. To ensure correct, efficient and safe operation of a 3D printer, the respective operating parameters are set appropriately for each build operation.

Certain examples described herein reduce the risks associated with using incorrect 3D printer operating parameters with build material, such as build powder. In a 3D printer system in which the build unit is separable from the 3D printer, a typical refilling operation may involve an operator decoupling and removing the build unit from the 3D printer and connecting it to the build powder management station to fill the build unit with a new build material or refill the build unit with the more of the same build material. The build unit may then be returned to the 3D printer. Once the build unit is filled or replenished, the 3D printer can execute further 3D print operations.

The risk of combustion or explosion may be exacerbated in 3D printers which are capable of printing using more than one type of build material, where, for example, the fusing temperature of one type of build material is higher than the ignition temperature of another type of build material. In such cases, if an operator of the 3D printer selects incorrect operating parameters for a selected build material, there is a risk of combustion or explosion.

Fusing and ignition temperatures of the build material may depend, for example, on the composition of the build material and ambient conditions. For example, the fusing temperature of PA may be in the range 170° C. to 230° C. and the ignition temperature of TPU may also be in the range 170° C. to 230° C., depending on composition and ambient conditions. Therefore, in some conditions, the fusing temperature of PA may be higher than the ignition temperature of TPU. For example, for some compositions, the fusing temperature of PA may be 190° C. and the ignition temperature of TPU may be 140° C.

Some example systems and methods disclosed herein can reduce the likelihood of operating a 3D printer with operating parameters that are not suitable for a build material, such as a build powder, that is in a build unit. In particular, examples described herein address the aforementioned risks associated with an operator placing a build powder in the build unit.

According to an example, a 3D printing apparatus comprises a 3D printer arranged to perform a print operation using build material whilst a build material temperature sensed by the printer is below a threshold temperature of the build material. The threshold temperature thereby acts as a cut-off setting that can be used to prevent overheating of the build material. The printer is arranged to obtain a threshold temperature indicator in advance of a respective print operation. The threshold temperature indicator determines the threshold temperature. The indicator may be a temperature or any other designation that is understood by a 3D printer to indicate a certain temperature (e.g. no greater than) or temperature range (e.g. operation within). Any suitable form of data that can be used as such an indicator may be used.

In some examples, the threshold temperature may be set to provide a margin of safety. For example, the threshold temperature may be set at below the ignition temperature by a known margin, such as 50° C. below the ignition temperature.

FIG. 1 shows a simplified schematic diagram of a 3D printing apparatus 100 according to an example comprising a 3D printer 102 coupled to a build unit 104.

According to an example, a 3D print operation comprises depositing a layer of build material onto a build platform of the build unit 104, selectively depositing a fusing agent and optionally a detailing agent onto the layer of build material and applying energy such as heat to fuse the build material. The heat may be provided by one or more heating elements to fuse the portions of the build material where the fusing agent has been applied. For example, the heating elements may irradiate a layer of build material with infrared radiation or ultraviolet radiation. In some examples, during the print operation, the build material may be maintained at a temperature slightly below the fusing temperature of the build material so that the amount of energy supplied by the heating elements and absorbed by the fusing agent to fuse the build material is reduced.

In the example shown in FIG. 1, the build unit 104 is detachable from the 3D printer 102. In particular, the build unit 104 may be removed by an operator to perform a refill operation of the build unit 104.

The build unit 104 stores a supply of build material, for example, build powder. In one example a clean-up stage is performed on the build unit prior to a build powder fill operation. For example, in one case a clean-up stage comprises a powder management station removing unused build material from the build unit and combining the unused build material with fresh build material for a further print operation. Unused build material may be recovered and recycled by a build powder management station, for instance, and mixed with virgin (or new) build material. Following a build powder fill operation, the operator may return the build unit 104 to the 3D printer 102 to perform further print operations.

In the example shown in FIG. 1, the 3D printer 102 of the 3D printing apparatus 100 comprises an interface 106 to receive a threshold temperature, a sensor 108 to detect a build material temperature during a print operation (that is, the temperature at the surface of the build unit which is indicative of the temperature of a layer of build material to which energy is being applied to fuse the build material), and a circuit 110 responsive to a detected temperature exceeding the threshold temperature to limit or prevent heating of the build material.

FIG. 1 shows the build unit 104 comprising a thermal protection module 112. The thermal protection module 112 comprises memory 114 for storing a threshold temperature. According to an example, the thermal protection module 112 may be coupled to the build unit 104 such that the threshold temperature can be received by the 3D printer prior to the 3D printer 102 performing a print operation. In the example shown in FIG. 1, the build unit 104 comprises an interface to couple to the interface 106 of the 3D printer 102. With the interface 116 of the build unit 104 coupled to the interface 106 of the 3D printer 102, data from the thermal protection unit 112 may be sent from the memory 114 to the 3D printer 102, or retrieved from the memory 114 by the 3D printer 102.

The thermal protection module 112 may, for example, be a hardware module. In some examples, the thermal protection module 112 may comprise an IEC60730 compliant microcontroller. The microcontroller may be programmed with a simple code enabling transfer of the threshold temperature. Implementing the thermal protection module 112 in an IEC60730 compliant microcontroller may facilitate safety certification of the 3D printing apparatus 100 for use with multiple build materials.

The values stored in the memory 114 may be numerical values or data representing numerical values. For example, values indicating a temperature above which a particular build material should not be raised may be stored in the memory 114. The values stored in the memory 114 may initially be set during a build powder fill operation. For example, the 3D printer 102 may be arranged to perform a print operation using build material from the build unit 104 whilst a build material temperature sensed by the printer is below a threshold temperature of the build material, which is set in advance of a respective print operation. For example, the threshold temperature for a given build material may be set in the memory 114 during a build powder fill operation of the build unit 104.

In examples where the build unit 104 is integral with the 3D printer 102, the build material may be provided to the 3D printer 102 from a storage container. In this case, the build unit 104 may or may not comprise a build material store. Build material may be delivered from the storage container to a hopper in the 3D printer 102, or the storage container may be installable in the 3D printer 102 as a consumable. In either case, the 3D printer 102 may obtain the temperature threshold from the storage container.

Figure 2:
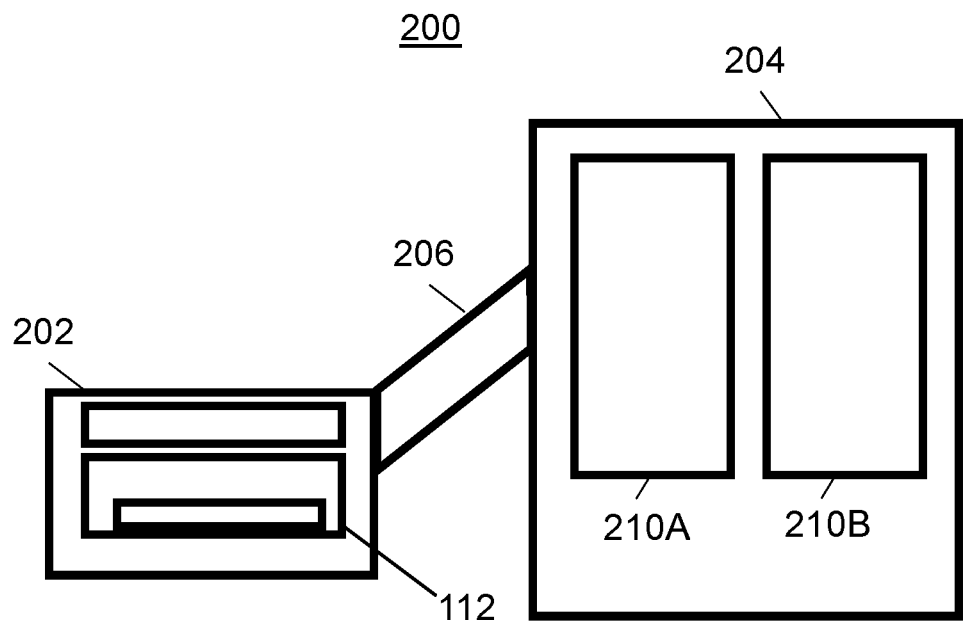
FIG. 2 is a schematic diagram of an apparatus for refilling a build unit of a 3D printing apparatus according to an example.
Figure 2:
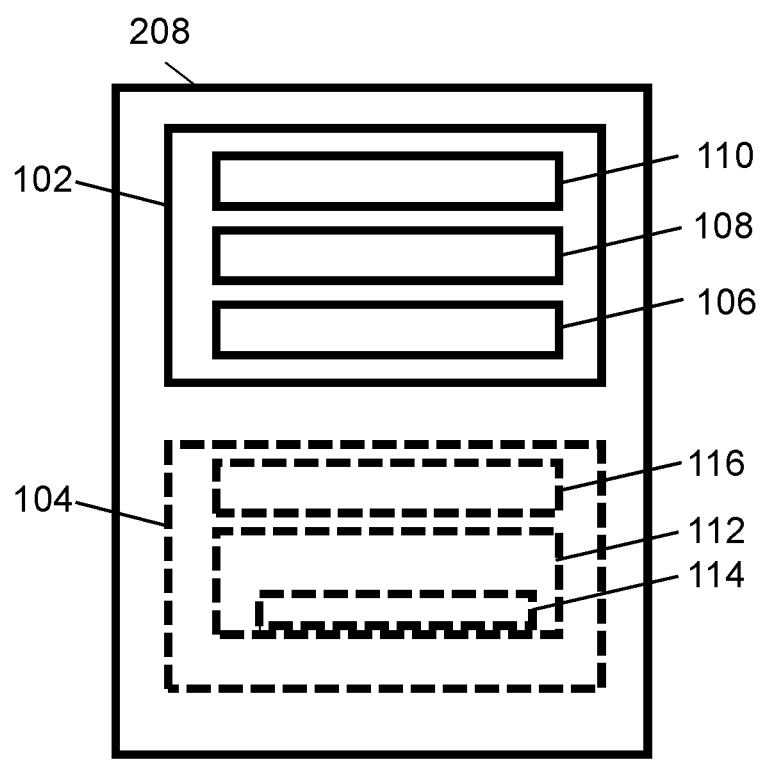

FIG. 2 is a simplified schematic diagram showing an apparatus 200 for refilling a build unit 202 according to an example. The apparatus 200 comprises a build unit 202 and a build powder management station 204, which may be connectable to one another via a connector 206 for refilling purposes. In this example the build unit 202 is detachable from a respective 3D printer 208 so that it can be moved and coupled to the build powder management station 204. In FIG. 2, the build powder management station 204 is shown containing two build material supplies 210A and 210B corresponding to one or more supplies of build powder. The build powder management station 204 is arranged to supply build material to the build unit 202, from one of the build material supplies 210A, 210B, during a build powder fill operation via the connector 206. According to an example, an operator can control the build powder management station 204, for example, via a user interface, to refill the build unit 202. Following a build powder fill operation the operator can return the build unit 202 to the 3D printer 208 such that the build unit 202 and 3D printer 208 may execute further print operations.

Similar to the build unit 104 shown in FIG. 1, the build unit 202 shown in FIG. 2 comprises a thermal protection module 112 comprising memory for storing a threshold temperature associated with a build material.

According to an example, the threshold temperature associated with the build material is set by the powder management station 204 as part of a build powder fill operation. The threshold temperature may then be retrieved by a 3D printer in advance of a printing operation as described above with reference to FIG. 1. In an example, the powder management station 204 may read the threshold temperature from a non-volatile memory of the build material supply 210A, 210B being used to fill the build unit 202. The powder management station 204 may then supply the threshold temperature to the thermal protection unit 112 of the build unit 202.

Figure 3:
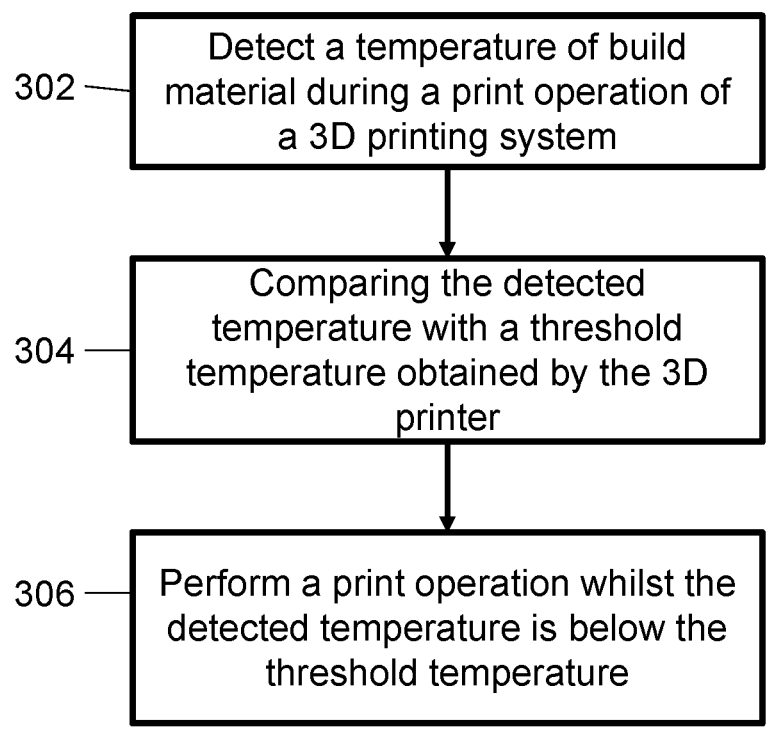
FIG. 3 is a flow diagram showing a method of performing a print operation according to an example.

FIG. 3 is a flow diagram showing a method 300 of performing a print operation according to an example.

At block 302, build material temperature in a 3D printing system is detected during a print operation. For example, the temperature may be detected at one or more locations in a layer of build material using a temperature sensor. In some examples, a thermal imaging camera may be used to detect temperatures at an array of locations across a layer of build material.

At block 304, the temperature detected at block 302 is compared with a threshold temperature received by the 3D printer. The threshold temperature may, for example, have been received from a build unit previously coupled to the 3D printer prior to commencement of the print operation. In other examples, where the build unit is integral with the 3D printer, the threshold temperature may have been received directly from a container containing a supply of build material.

At block 306, the 3D printer performs a printing operation whilst the detected temperature is below the threshold temperature. For example, as described below with reference to FIG. 5, in the event that the detected temperature exceeds the threshold temperature during a print operation, power to a heating circuit may be disabled or limited, preventing or limiting further heating of the build material.

Figure 4:
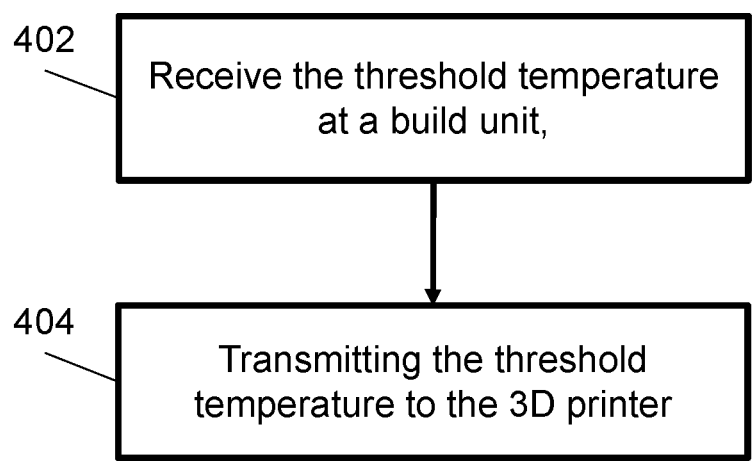
FIG. 4 is a flow diagram showing a method of performing a print operation according to an example.

FIG. 4 is a flow diagram showing another method 400 of performing a print operation according to an example.

At block 402, the threshold temperature is received at a build unit. For example, the data may be received from a powder management station such as the powder management station 204 described above with reference to FIG. 2.

The threshold temperature may be stored in memory such as the memory 114 described above with reference to FIG. 1.

At block 404, the threshold temperature is transmitted from the build unit to a 3D printer. For example, the threshold temperature may be transmitted to the 3D printer once the build unit has been inserted in the 3D printer prior to commencement of a 3D print operation. In some examples, the threshold temperature may be transmitted to the 3D printer in response to a request from the 3D printer to the thermal protection module. In other examples, the thermal protection module may transmit the temperature threshold to the 3D printer without receiving a request from the 3D printer.

Figure 5:
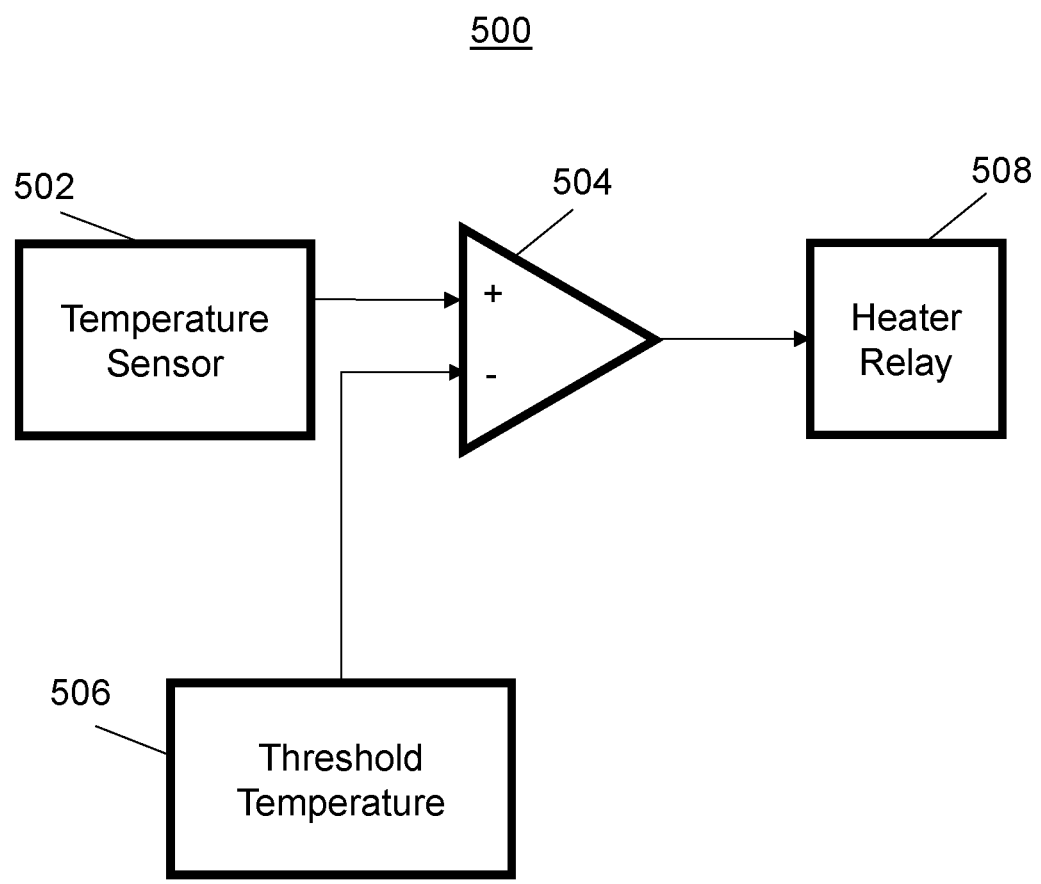
FIG. 5 is a circuit responsive to a detected temperature exceeding a temperature cut-off setting to limit or prevent heating of a build material.

FIG. 5 is a circuit diagram of a circuit 500 responsive to a detected temperature exceeding a threshold temperature to limit or prevent heating of a build material according to an example. The circuit 500 comprises a temperature sensor 502 coupled to an input of a comparator 504. Another input of the comparator 504 receives a threshold temperature 506 from, for example, the temperature protection module 112 of a build unit, such as the build unit 104 described above with reference to FIGS. 1 and 2. An output of the comparator 504 is coupled to a heater relay 508 for controlling power to the heater element(s) of the 3D printer. In the event that a temperature detected by the temperature sensor 502 exceeds the threshold temperature 506, the comparator 504 may be arranged to provide an output signal such that the heater relay 508 disconnects or limits power provided to a heater circuit of the 3D printer. That is power to heating elements of the 3D printer 100, 208 may be cut-off or limited to prevent significant further heating of the build material. Such an arrangement may prevent heating of the build material above safe levels regardless of the type of build material supplied to the 3D printer and regardless of any contravening instructions by software controlling the 3D printer. In some examples, operation of the 3D printer will stop in response to power to heating elements of the 3D printer being cut-off or limited. In some examples, the 3D printer may alert a user of the 3D printer; for example, a message may be displayed to the user.

Although, in the examples described above, the threshold temperature is received from the supply of build material via the temperature protection module of the build unit, in examples where the build unit is integral with the 3D printer, that such a threshold temperature may be received by the 3D printer directly from a container containing a supply of build material.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of operating a 3D printing apparatus, the method comprising:
   detecting a temperature of build material during a print operation of a 3D printing system;
   comparing the detected temperature with a temperature cut-off setting obtained by the 3D printer; and
   performing the print operation by the 3D printing system whilst the detected temperature is below the temperature cut-off setting and curtailing the print operation of the 3D printing system in response to the detected temperature reaching the temperature cut-off setting so as to indicate a risk of igniting the build material in the 3D printing system.

2. A method comprising:
   receiving, at a build unit, data representing a temperature cut-off setting based on a temperature at which a powdered build material ignites, the data being received from a powder management station corresponding to a specific build material being supplied by the powder management station; and transmitting the data to a 3D printer that is going to use the specific build material supplied by the powder management station to build an object so that the 3D printer can avoid ignition of the build material during formation of the object.

3. A method according to claim 2, further comprising, with the 3D printer, comparing a detected temperature of the build material with the temperature cut-off setting; and with an output of the comparison, controlling a heater relay for governing heating of the build material by the apparatus, the heater relay to reduce or interrupt power to heater elements of the 3D printer in response to the comparison indicating the build material temperature has reached a temperature of the temperature cut-off setting.

4. A 3D printing apparatus comprising a 3D printer arranged to perform a print operation using build material whilst a build material temperature sensed by a temperature sensor of the 3D printer is below a threshold temperature of the build material, the 3D printer arranged to obtain a threshold temperature indicator in advance of a respective print operation; and further comprising a thermal protection module to interrupt the print operation when the build material temperature reaches the threshold temperature.

5. A 3D printing apparatus according to claim 4, comprising a build unit comprising a build platform on which the 3D printer forms a desired object, wherein the 3D printer is arranged to obtain the threshold temperature indicator from the build unit.

6. A 3D printing apparatus according to claim 5, comprising an interface for interfacing with a control module in the build unit, wherein the control module is to receive the threshold temperature indicator from the build unit via the interface.

7. A 3D printing apparatus according to claim 4, wherein the 3D printer is arranged to obtain the threshold temperature indicator from a container containing a supply of build material.

8. A 3D printing apparatus according to claim 4, comprising a comparator circuit to compare output of the temperature sensor with the threshold temperature.

9. A 3D printing apparatus according to claim 8, comprising a power relay to provide power to a heating system of the printing apparatus, wherein a state of the power relay is dependent on an output of the comparator circuit.

10. A 3D printing apparatus according to claim 9, wherein the threshold temperature is supplied as a reference signal to the comparator circuit and the detected temperature is supplied as an input signal to the comparator circuit.

11. A 3D printing apparatus according to claim 4, further comprising a thermal protection module to reduce heating of the print operation when the build material temperature reaches the threshold temperature.

12. A 3D printing apparatus comprising a 3D printer arranged to perform a print operation using build material from a build unit, the apparatus comprising:

a memory unit storing a temperature cut-off setting that is associated with the build material in the build unit, the temperature cut-off setting based on a temperature at which the build material in the build unit is combustible;

a sensor to detect a build material temperature during a print operation; and a circuit having an interface with the memory unit, the circuit responsive to the sensor detecting a temperature exceeding the temperature cut-off setting, the circuit structured to limit or prevent heating of the build material in response to the sensor detecting a build material temperature exceeding the temperature cut-off setting, the circuit comprising a comparator arranged to receive the output of the sensor detecting the build material temperature and a signal corresponding to the temperature cut-off setting, wherein an output of the comparator is connected to a heater relay for governing heating of the build material by the apparatus, the heater relay to reduce or interrupt power to heater elements of the 3D printing apparatus in response to the output of the comparator indicating the build material temperature has reached a temperature of the temperature cut-off setting.

13. A 3D printing apparatus according to claim 12, wherein the memory is on the build unit and the interface is to receive the temperature cut-off setting from the memory on the build unit, wherein the build unit is a removable build unit that is removable from the 3D printing apparatus.

14. A 3D printing apparatus according to claim 12, wherein the circuit further comprising a display to alert a user with a displayed message when the heater relay reduces or interrupts power to the heater elements.

15. A 3D printing apparatus according to claim 12, comprising a powder management station, the powder management station being to provide the build material to the build unit and/or retrieve build material from the build unit.

16. A 3D printing apparatus according to claim 12, wherein the temperature cut-off setting is less than an ignition temperature of the specific build material by a safety margin.

17. A 3D printing apparatus according to claim 16, wherein the safety margin is 50° C. below the ignition temperature.

18. A 3D printing apparatus according to claim 15, the build unit comprising the memory unit and an interface for the memory to receive the temperature cut-off setting from the powder management station.

* * * * *